United States Patent [19]

Riley

[11] Patent Number: 5,500,852
[45] Date of Patent: Mar. 19, 1996

[54] METHOD AND APPARATUS FOR NETWORK VARIABLE ALIASING

[75] Inventor: Glen M. Riley, Saratoga, Calif.

[73] Assignee: Echelon Corporation, Palo Alto, Calif.

[21] Appl. No.: 299,203

[22] Filed: Aug. 31, 1994

[51] Int. Cl.$^6$ ............................................. H04L 12/02
[52] U.S. Cl. ................... 370/16; 370/85.6; 370/85.8; 370/95.2; 340/825.08; 340/825.51
[58] Field of Search ................ 370/79, 85.1, 16, 370/85.2, 85.6, 85.7, 85.8, 95.1, 95.2; 340/825.06, 825.08, 825.07, 825.5, 825.51, 825.54

[56] References Cited

U.S. PATENT DOCUMENTS

| | | | |
|---|---|---|---|
| 3,582,901 | 6/1971 | Cochrane | 340/172.5 |
| 3,648,244 | 3/1972 | McGee | 364/172.5 |
| 4,001,785 | 1/1977 | Miyazaki et al. | 340/172.5 |
| 4,007,450 | 2/1977 | Haibt et al. | 340/172.5 |
| 4,090,248 | 5/1978 | Swanson et al. | 340/825.06 |
| 4,216,528 | 8/1980 | Robertson | 364/468 |
| 4,319,338 | 3/1982 | Grudowski | 364/400 |
| 4,373,193 | 2/1983 | Haag et al. | 364/900 |
| 4,386,416 | 5/1983 | Giltner et al. | 364/900 |
| 4,404,651 | 9/1983 | Grudowski | 364/900 |
| 4,432,057 | 2/1984 | Daniell et al. | 364/300 |
| 4,507,735 | 3/1985 | Moorehead et al. | 364/422 |
| 4,539,637 | 9/1985 | DeBruler | 364/200 |
| 4,544,418 | 11/1985 | Toy | 179/2 |
| 4,545,013 | 10/1985 | Lyon et al. | 364/200 |
| 4,567,557 | 1/1986 | Burns | 340/825.06 |
| 4,568,930 | 2/1986 | Livingston et al. | 340/825.5 |
| 4,570,217 | 2/1986 | Allen et al. | 364/188 |
| 4,589,063 | 5/1986 | Shah et al. | 364/200 |
| 4,635,189 | 1/1987 | Kendall | 364/200 |
| 4,654,654 | 3/1987 | Butler et al. | 340/825.5 |
| 4,663,704 | 5/1987 | Jones et al. | 364/188 |
| 4,714,995 | 12/1987 | Matern et al. | 364/100 |
| 4,720,782 | 1/1988 | Kivalcin | 364/200 |
| 4,727,575 | 2/1988 | Hansen et al. | 379/94 |
| 4,730,348 | 3/1988 | MacCrisken | 375/122 |
| 4,827,423 | 5/1989 | Beasley et al. | 364/468 |
| 4,831,582 | 5/1989 | Miller et al. | 364/900 |
| 4,843,545 | 6/1989 | Kikuchi | 364/300 |
| 4,855,906 | 8/1989 | Burke | 364/200 |
| 4,868,570 | 9/1989 | Davis | 341/106 |
| 4,885,684 | 12/1989 | Austin et al. | 364/300 |
| 4,918,690 | 4/1990 | Markkula, Jr. et al. | 370/94 |
| 4,926,375 | 5/1990 | Mercer et al. | 364/900 |
| 4,937,760 | 6/1990 | Beitel et al. | 364/513 |
| 4,939,728 | 7/1990 | Markkula, Jr. et al. | 370/94.3 |
| 4,972,367 | 11/1990 | Burke | 364/900 |
| 4,974,151 | 11/1990 | Advani et al. | 364/200 |
| 4,980,822 | 12/1990 | Brantley, Jr. et al. | 364/200 |
| 5,068,850 | 11/1991 | Moore | 370/85.8 |
| 5,093,916 | 3/1992 | Karp et al. | 395/700 |
| 5,101,348 | 3/1992 | Arrowhead et al. | 395/200 |
| 5,109,486 | 4/1992 | Seymour | 395/200 |
| 5,146,607 | 9/1992 | Sood et al. | 395/800 |
| 5,148,533 | 9/1992 | Joyce et al. | 395/425 |
| 5,175,691 | 12/1992 | Baker et al. | 364/478 |
| 5,198,809 | 3/1993 | Day | 340/825.06 X |

FOREIGN PATENT DOCUMENTS

| | | | |
|---|---|---|---|
| 0412232 | 2/1991 | European Pat. Off. | G06F 9/46 |
| 90/15394 | 12/1990 | WIPO | G06F 15/46 |
| 91/03017 | 3/1991 | WIPO | G06F 9/46 |
| 92/16895 | 10/1992 | WIPO | G06F 13/00 |

OTHER PUBLICATIONS

Muller, Raimund. *LON–das universelle Netzwerk*, 2087 Elektronik, 40(1991)29 Oct., No. 22, Munchen, DE, pp. 59–62, 64–65, 68–69.

Health, Steve. *Targetted MCU design for control networks*, Electronic Product Design, Jul. 1991, vol. 12, No. 7, pp. 21, 23–24.

Ginsparg, Jerrold M. & Ronald D. Gordon, Automatic Programming of Communications Software Via NonProcedural Descriptions, 1982 IEEE, pp. 1343–1347.

*Primary Examiner*—Douglas W. Olms
*Assistant Examiner*—Russell W. Blum
*Attorney, Agent, or Firm*—Blakely, Sokoloff, Taylor & Zafman

[57] ABSTRACT

A method and apparatus for resolving connection conflicts in a network is provide. A network connection point on a node cannot be added to a first network connection when it already belongs to a second network connection. When a particular configuration would otherwise violate this rule, a network connection point on the node is established as an alias to the network connection point. The alias network connection point is added to the first network connection. A correlation is established between the alias network connection point and the network variable that is associated with the network connection point. If the network variable is an input network variable, then the value of the network variable is updated responsive to messages received on either the first or the second connection. If the network variable is an output network variable, then messages are sent over both the first and second connections when the network variable is updated. The correlation between the alias network connection point and the network variable may be established through tables in the apparatus, or through the use of an alias variable defined in the same application as the network variable.

14 Claims, 13 Drawing Sheets

METHOD AND APPARATUS FOR NETWORK VARIABLE ALIASING

BACKGROUND OF THE INVENTION

1. Field of Invention

The present invention relates to the field of network communications. In particular, the present invention describes a method and apparatus for network variable aliasing.

2. Description of Related Art

In most computer networks, information is communicated using messages. Nodes on the network prepare messages and transmit the messages to other nodes on the network. Each message contains a number of bytes identifying the message (a "header") and a number of bytes corresponding to the information to be communicated. These types of networks can be used in control systems. For example, a control system network can be used to control the heating, lighting and the ventilation of a large building.

Nodes contain the mechanisms through which application programs can share information with other application programs. Application programs store information in variables. For example, a switch control application may store in a variable SW1 a value indicating whether a particular switch is on. The value of the variable SW1 may be required by a light control application program which controls power to a light. The light control application program may store this value in a variable with a different name than that used by the switch control application. For example, the light control application may store the value in a variable LGT5. The process of communicating the value stored in the variable SW 1 of the switch control application to the variable LGT5 in the light control application involves (1) communicating the value stored in SW 1 to a node (NODE 1) associated with the switch control program, (2) packaging the value in a message, (3) sending the message to a node (NODE2) associated with the light control program, (4) retrieving the value from the message, and (5) storing the value in the variable LGT5 of the light control program.

If the value of a variable in one application is sent over the network to another application, the variable is referred to as an output network variable. If the value of a variable in one application is updated based on information sent over the network from another application, then the variable is referred to as an input network variable.

As mentioned above, the variables used to store the same value in different applications may have different names. To make sure that information is routed to and from the correct network variables, a common connection name or "selector" is assigned to each of the related network variables. For example, the connection used to transfer the value of SW1 between the NODE1 and NODE2 may be assigned the selector "CN1".

Each network variable corresponds to a network connection point on a node. Each node stores information indicating the correspondence between each of its network connection points and the connection to which its network connection points correspond. For example, NODE 1 would keep track of the fact that connection CN1 corresponds to a network connection point associated with SW1, and NODE2 would keep track of the fact that connection CN1 corresponds to a network connection point associated with LGT5. Thus, when NODE1 is instructed to send the value of SW1, it sends the value to NODE2 in a message which identifies the connection CN1. When NODE2 receives the message, it determines that the message is associated with connection CN1, and therefore knows to store the value contained in the message in variable LGT5.

A node may keep track of the correspondence between its network connection points and their respective connections by maintaining a table in which each entry includes data indicating a network variable and the selector for the network variable.

Certain constraints exist on the network variable-to-connection mapping. For example, there may be only one connection associated with each network connection point of a given node. For example, the network connection point associated with SW1 may not be associated with any connection other than connection CN1. Similarly, within NODE2, the network connection point associated with LGT5 may not be associated with any connection other than connection CN1. More specifically, an input network variable can only be associated with one connection and no other input network variable of that node can be associated with that same connection. Similarly, an output network variable can only be associated with one connection and no other output network variable of that node can be associated with that same connection.

As a result of these constraints, when a connection is made between an input variable and an output variable and one of the variables is already in a connection, then the new connection must use the same selector as the previous connection. For example, if a valve control application associated with a NODE3 has a variable VC1 into which the value of SW1 must be stored, then the network connection point associated with the variable VC1 must be associated with the selector CN1. If the network connection point associated with VC1 was associated with a different selector, then NODE3 would not know to store the value contained in the messages identifying connection CN1 into VC1.

Because only one selector can be associated with each network connection point of a node and because the selector is used to determine which input variables to update when a network variable message is received, some network configurations are illegal. For example, consider the situation shown in FIG. 1 in which a node 100 has two output network variables SW1 and SW2. The value of SW1 indicates whether a switch 104 is on, and the value of SW2 indicates whether a switch 106 is on. A node 102 has two input network variables LGT1 and LGT2. The value of LGT1 determines whether a light 108 is on, and the value of LGT2 determines whether a light 110 is on. A user may want the switch 104 to control the light 108, and the switch 106 to control both light 108 and light 110.

To establish a connection between the variables SW1 and LGT1, a selector is established for the messages which convey the value of SW 1 to node 100. The process of establishing a connection between variables is referred to herein as "binding" the variables. For example, SW1 may be bound to LGT1 by establishing a selector CN1 between the output 112 of node 102 associated with the variable SW1 and the input 116 of node 100 associated with variable LGT1. This binding is illustrated by line 120. Node 100 would store a selector indicating that SW 1 is associated with CN1, and node 102 would store a selector indicating that LGT1 was associated with CN1.

To allow the switch 106 to control both the light 108 and light 110, SW2 must be bound to both LGT1 and LGT2. Since LGT1 already belongs to a connection, the name of the pre-existing connection (CN1) must be used to bind the output 114 associated with SW2 to the input 116 associated with LGT1. The resulting binding is illustrated by line 122. Thus, messages sent over connection CN1 responsive to switch 106 will be used to update LGT1. I0 For the switch 106 to also control the light 110, SW2 must also be bound to LGT2. Since SW2 now belongs to the connection CN1, the binding of SW2 to LGT2 is performed by establishing the input 118 associated with LGT2 as part of connection CN1. This binding is illustrated by line 124. After these bindings are performed, both LGT1 and LGT2 will be associated with the same connection CN1. Therefore, both LGT1 and LGT2 will be updated by messages identifying CN1.

Unfortunately, the configuration shown in FIG. 1 does not yield the desired functionality. Specifically, node 100 would not be able to distinguish between messages containing the value SW1 and messages containing the value SW2, since both would be identified by the selector CN1. Thus, a message indicating that switch 104 was turned on would affect both lights 108 and 110. In addition, if node 102 is polled over connection CN1, it would not know whether to respond by sending the value contained in SW1, the value contained in SW2, or two messages, one for SW1 and one for SW2. If node 102 sent two messages in response to a single polling operation, node 100 would not know how to interpret the two responses. Typically, the second response would be discarded as a duplicate of the first response.

Another problematic configuration is illustrated in FIG. 2. In FIG. 2, a connection labeled "1" connects an output network connection point 208 of a node 200 with an input network connection point 210 of a node 202 and an output network connection point 212 of a node 204. A connection labeled "2" connects an output network connection point 216 of node 200 with an input network connection point 214 of a node 206. This configuration may occur, for example, if input network connection point 210 is associated with a light and output network connection points 212 and 208 are associated with switches to control the light, while input network connection point 214 is associated with a second light and output network connection point 216 is associated with a switch to control the second light.

A problem occurs when an attempt is made to bind output network connection point 212 with input network connection point 214. This binding may be desirable, for example, to control the lights associated with inputs 210 and 214 with the single switch associated with output network connection point 212. Input network connection point 214 is already associated with connection "1", while output network connection point 212 is already associated with connection "2". Since neither input network connection point 21.4 nor output network connection point 212 can be associated with both connections "1" and "2", input network connection point 214 cannot be bound with output network connection point 212. This type of problem is referred to hereafter as a connection conflict.

Based on the foregoing, it is desirable to provide a control system with greater flexibility than is currently provided. It is also desirable to provide a node with fewer configuration constraints than the nodes currently used in control networks. Further, it is desirable to provide an apparatus and method for handling connection conflicts.

SUMMARY OF THE INVENTION

An apparatus for communicating information between applications in a network is provided. The apparatus includes a first network connection point, a second network connection point, memory, a transmit mechanism and an update mechanism.

The first network connection point is coupled to at least one node on the network by a first connection. The second network connection point is coupled to at least one node on the network by a second connection, where the second connection is different from the first connection.

The memory contains an application which defines a network variable, a first indicator indicating that the network variable corresponds to the first network connection point, a second indicator indicating that the first network connection point corresponds to the first connection, a third indicator indicating that the network variable corresponds to the second network connection point, and a fourth indicator indicating that the second network connection point corresponds to the second connection.

The transmit mechanism transmits a first message over the first connection and a second message over the second connection when the network variable is updated if the network variable is an output network variable. The update mechanism updates the network variable responsive to messages over the first connection and responsive to messages over the second connection if the network variable is an input network variable.

According to one aspect of the invention the memory stores a network variable configuration table and an alias configuration table. The second indicator is stored in an entry in the network variable configuration table. The third indicator and the fourth indicator are stored in an entry in the alias configuration table.

According to another aspect of the invention, the transmit mechanism transmits the first message responsive to information contained in the entry in the network variable configuration table and transmits the second message responsive to information contained in the entry in the alias configuration table. Optionally, the entry in the network variable configuration table may specify a different message priority level than the entry in the alias configuration table.

According to another embodiment of the present invention, a method for resolving connection conflicts in a network is provided. The method includes the step of detecting when a first network connection point of a node cannot be added to a second connection because the first network connection point belongs to a first connection. The first network connection point corresponds to a network variable.

According to the method, a second network connection point of the node is added to the second connection. A correspondence is established between the second network connection point and the network variable.

If the network variable is an input network variable, then the network variable updated responsive to messages received on the first network connection point. The network variable is also updated responsive to messages received on the second network connection point.

If the network variable is an output network variable, then when the network variable is updated with a value, the value is transmitted in a first message identifying the first connection though the first network connection point and the value is transmitted in a second message identifying the second connection through the second network connection point.

According to one aspect of the invention, a correspondence between the second network connection point and the network variable is established by providing an alias configuration table. An entry is added to the alias configuration table. The entry corresponds to the second network connection point and contains a selector identifying the second connection, and a network variable index identifying the network variable.

According to another aspect of the invention, the network variable is defined in an application associated with the node. A correspondence between the second network connection point and the network variable is established by defining an alias variable in the application, establishing a correspondence between the alias variable and the network variable, and establishing a correspondence between the alias variable and the second network connection point.

The network variable is updated by updating the alias variable responsive to messages received on the second network connection point, and updating the network variable responsive to updating the alias variable. The value is transmitted in a second message identifying the second connection through the second network connection point by updating the alias variable with the value and transmitting the value in the second message responsive to updating the alias variable.

A correspondence between the alias variable and the network variable may be established by defining a network-variable-to-alias map in the application and processing the network-variable-to-alias map to cause the network-variable-to-alias map to indicate a correspondence between the network variable and the alias variable.

According to yet another aspect of the invention, if network variable is an input network variable, then when the second network connection point is polled, a response message is transmitted through the second network connection point. When the first network connection point is polled, a response message is transmitted through the first network connection point. In both instances, the value sent in the message is the value of the same network variable.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW

An improved method and apparatus for communicating messages within a network is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

A NODE

Figure 3:
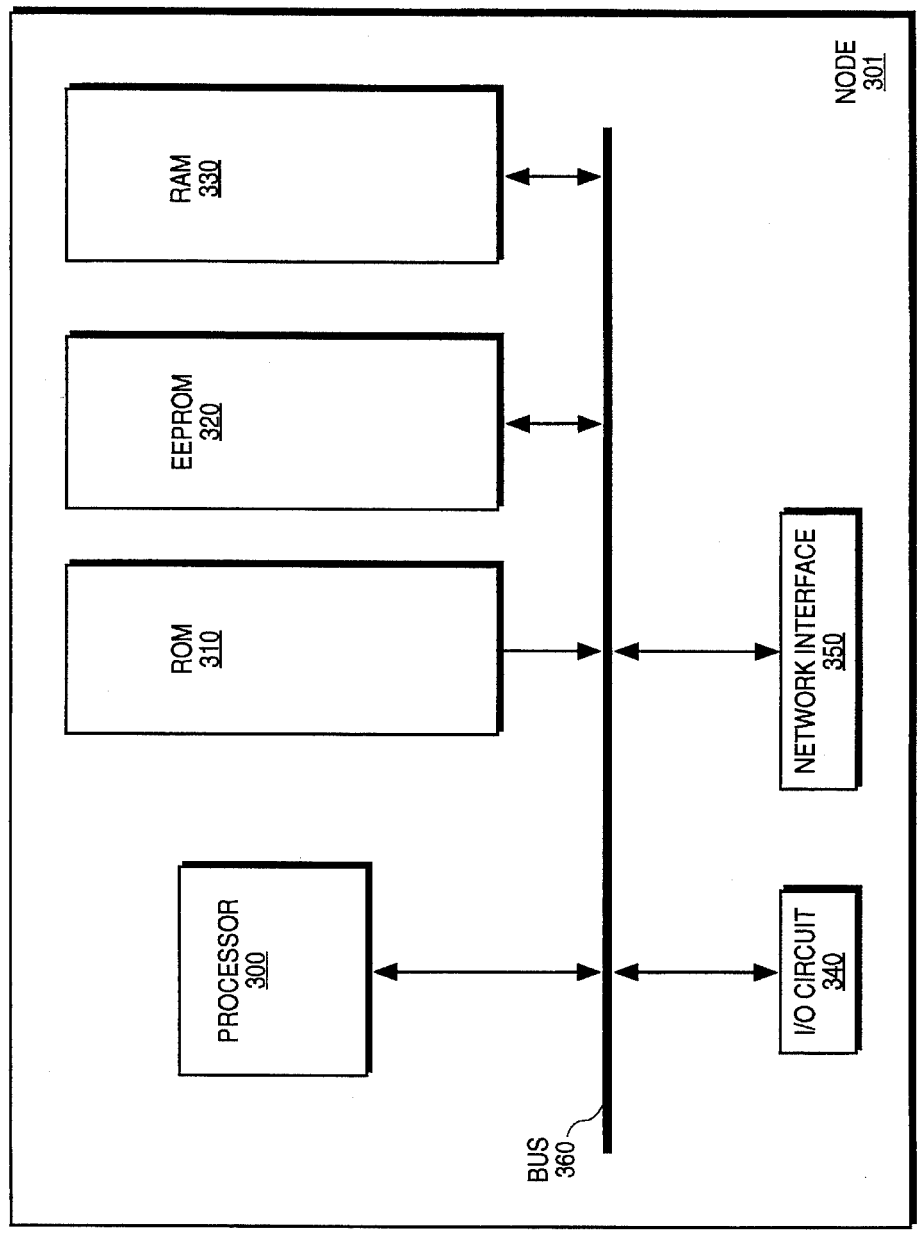
FIG. 3 illustrates a node within which an embodiment of the invention may be implemented.

FIG. 3 illustrates a node as may be used by one embodiment of the present invention. Node 301 includes a number of circuits which can be used to control devices and communicate on a network. Node 301 includes processor 300, ROM 310, EEPROM 320, RAM 330, I/O circuit 340, and network interface 350. Processor 300 controls all the other circuits on the node. Processor 300 communicates to the other nodes by bus 360. Application programs and network software can be executed on processor 300. Such nodes may be implemented using computer chips available from Motorola Corporation, part numbers MC143150 and MC143120.

ROM 310 is also coupled to bus 360. ROM 310 is permanent storage for initialization routines and fundamental node control routines, for example. EEPROM 320 is also coupled to bus 360. EEPROM 320 is typically used for storing information which changes rarely. For example EEPROM 320 may store an address table for network addresses. EEPROM 320 is also used to store information, which although changing, should not be lost in the event of a power loss.

RAM 330 is coupled to bus 360. RAM 330, typically, is used to store data which can vary often. For example, transaction ids can be stored in RAM 330.

I/O circuit 340 is coupled to bus 360. I/O circuit 340 is used to connect to the device, or devices, being controlled by the node 301. For example, I/O circuit 340 can be used to control the on/off switch of a ventilation system.

Network interface 350 is coupled to bus 360. Network interface 350 couples to the network medium and is used to communicate with other nodes on the network. The network medium can be any of a number of mediums, such as, twisted pair, wireless communications, or power lines.

Other combinations of circuits can be used in node 301. For example, the memory contained in ROM 310, and EEPROM 320 can be combined into one larger EEPROM 320. Processor 300 can be implemented in a number of processors rather than just the one shown in FIG. 3. One processor may be responsible for controlling I/O circuit 340 and another processor may be responsible for controlling access to the memories. In another embodiment of node 301, I/O circuit 340 can be a number of I/O circuits, all of which support different types of ! /0. Further, node 301 can be implemented on one or more substrates, and in one or more packages.

INTERMEDIARY MESSAGE CONVERSION NODES

Figure 2:
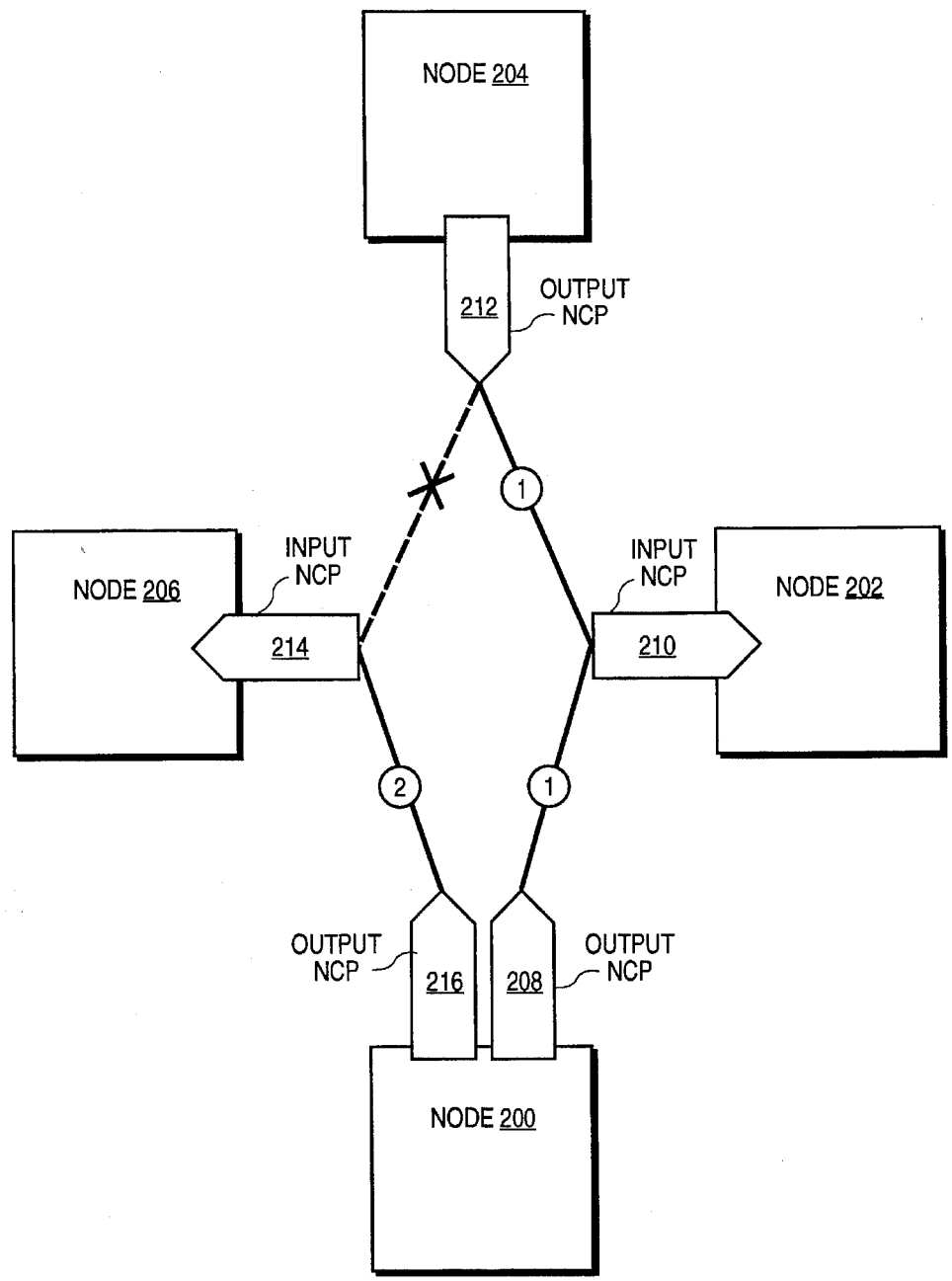
FIG. 2 illustrates a second node configuration which results in a connection conflict.
Figure 4:
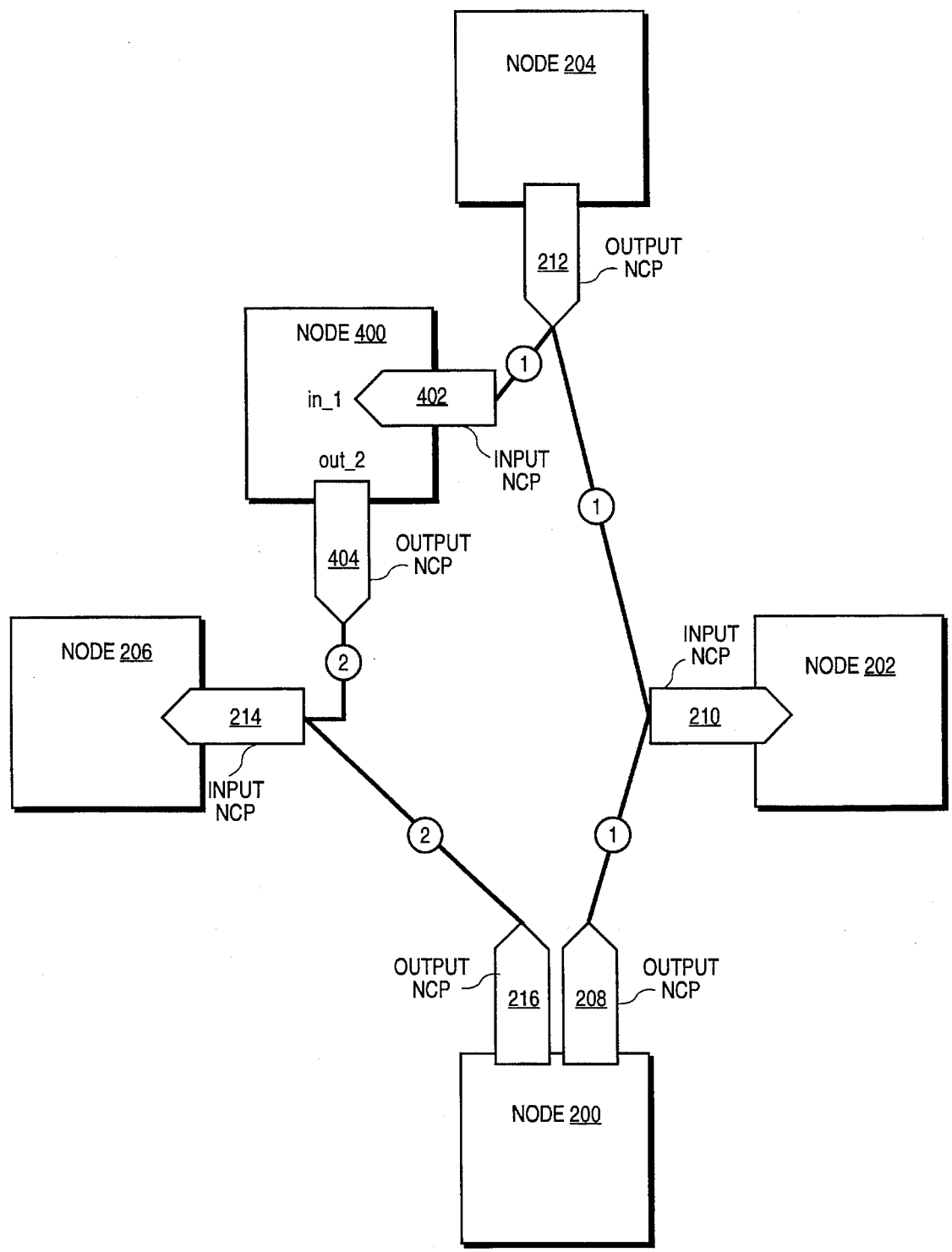
FIG. 4 illustrates a node configuration which resolves the conflict illustrated in FIG. 2 by adding a node to the system.

FIG. 4 illustrates an example control system network which overcomes the connection conflict problem described above with reference to FIG. 2. Specifically, an additional node 400 including an input network connection point 402 and an output network connection point 404 is introduced between nodes 204 and 206. Instead of coupling output network connection point 212 directly to input network connection point 214, output network connection point 212 is coupled to input network connection point 402 of node 400, and output network connection point 404 of node 400 is coupled to input network connection point 214. Since input network connection point 402 is not already associated with any connection, it may be associated with connection "1". Likewise, output network connection point 404 is not yet associated with any connection. Therefore output network connection point 404 may be associated with connection "2".

For the switch associated with output network connection point 212 to control the light associated with input network connection point 214, node 400 simply forwards messages received at input network connection point 402 to input network connection point 214 through output network connection point 404. The forwarding procedure would simply involve replacing the selector (which indicates connection "1") from messages received at input network connection point 402 with a selector indicating connection "2", and then transmitting the revised messages through output network connection point 404.

While the technique of using intermediary message conversion nodes such as node 400 solves the configuration problem described above with reference to FIG. 2, this technique has three disadvantages. First, the use of intermediary message conversion nodes increases the cost of the control system network. Second, the use of intermediary message conversion nodes makes the task of setting up a network more complex. A technician may have difficulty determining where and when to use intermediary message conversion nodes.

Third, the application associated with node 400 must be specifically programmed to handle the message conversion process. As explained above, each input and each output of a node is associated with a variable of an application. For example, input network connection point 402 may be associated with a variable in_1 of an application, while output network connection point 404 is associated with a variable out_1 of the application. The application must be programmed to assign the value of the variable in_1 to the variable out_1 when the variable in_1 is updated, and then to cause a message containing the value of out_1 to be transmitted through output network connection point 404. Ideally, the messaging mechanism used by the nodes in a control system network is transparent to the applications associated with the nodes. Therefore, placing the burden of handling message conversions on the application developers is undesirable.

SAME-NODE MESSAGE CONVERSION

Figure 5:
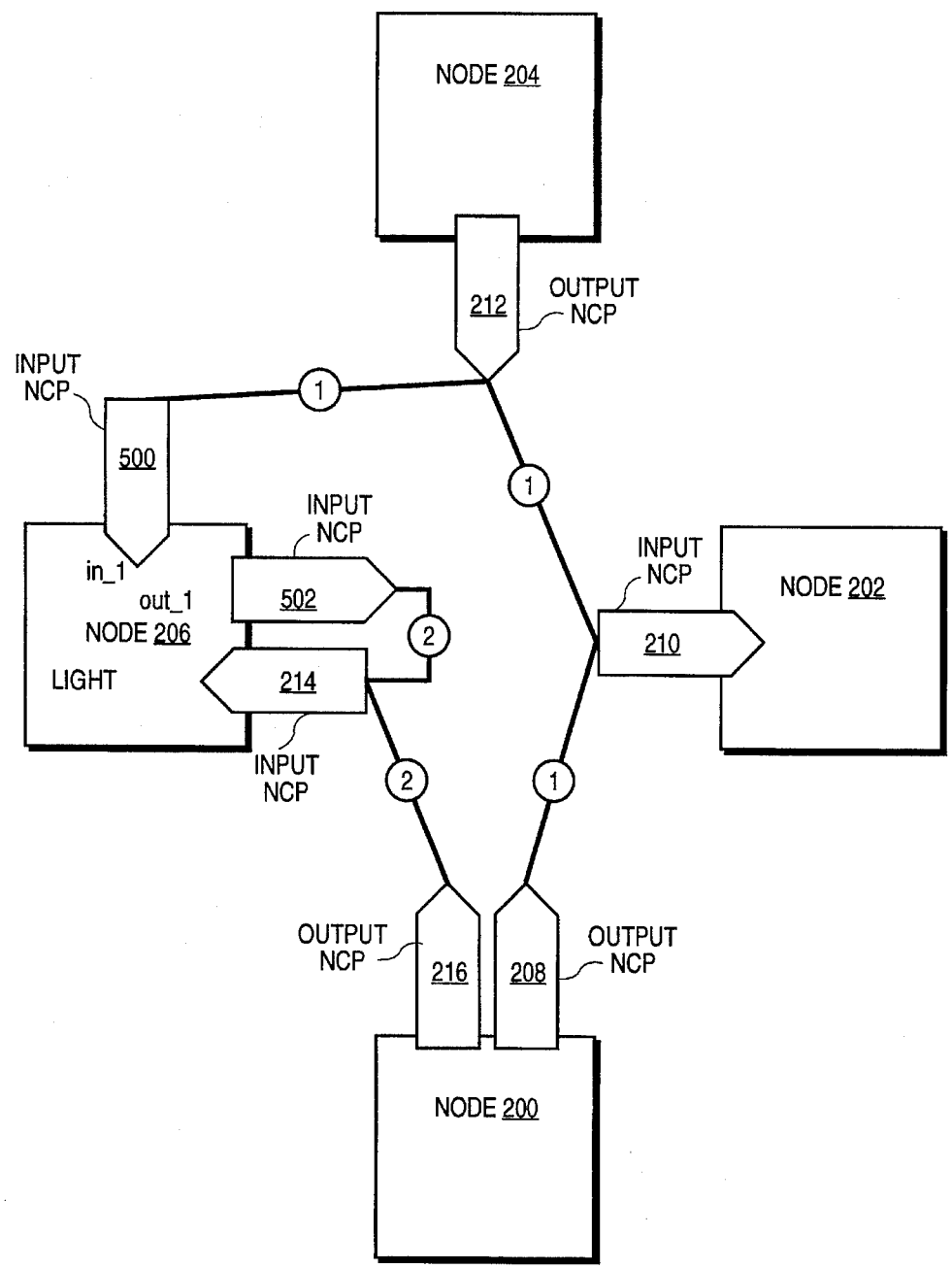
FIG. 5 illustrates a node configuration which resolves the conflict illustrated in FIG. 2 through use of additional input and output variables.

FIG. 5 illustrates a control system network which employs a variation of the message conversion process described above with reference to FIG. 4. Specifically, rather than have a separate intermediary node for convening a message:, node 206 itself may be programmed to perform the requisite message conversion. For example, output network connection point 212 may be coupled to an input network connection point of node 206 other than input network connection point 214, such as input network connection point 500 associated with the variable in_1. When a message from output network connection point 212 updates the variable in_1, the application associated with node 206 may assign the value of in_1 to a variable out_1. When the variable out_1 is thus updated, a message containing the revised value may be sent through an output network connection point 502 to input network connection point 214. Since input network connection point 500 is not otherwise associated with any connection, it may be associated with connection "1" without conflict. Likewise, since output network connection point 502 is not otherwise associated with any connection, it may be associated with connection "2" without any conflict.

The connection conflict resolution technique illustrated in FIG. 5 overcomes one of the disadvantages of the technique described with respect to FIG. 4. Specifically, no additional nodes are required to resolve connection conflicts. In addition, the process of installing a system may be less complex. However, the technique illustrated in FIG. 5 still requires application program intervention to handle connection conflicts.

APPLICATION-IMPLEMENTED ALIAS NETWORK VARIABLES

Figure 6:
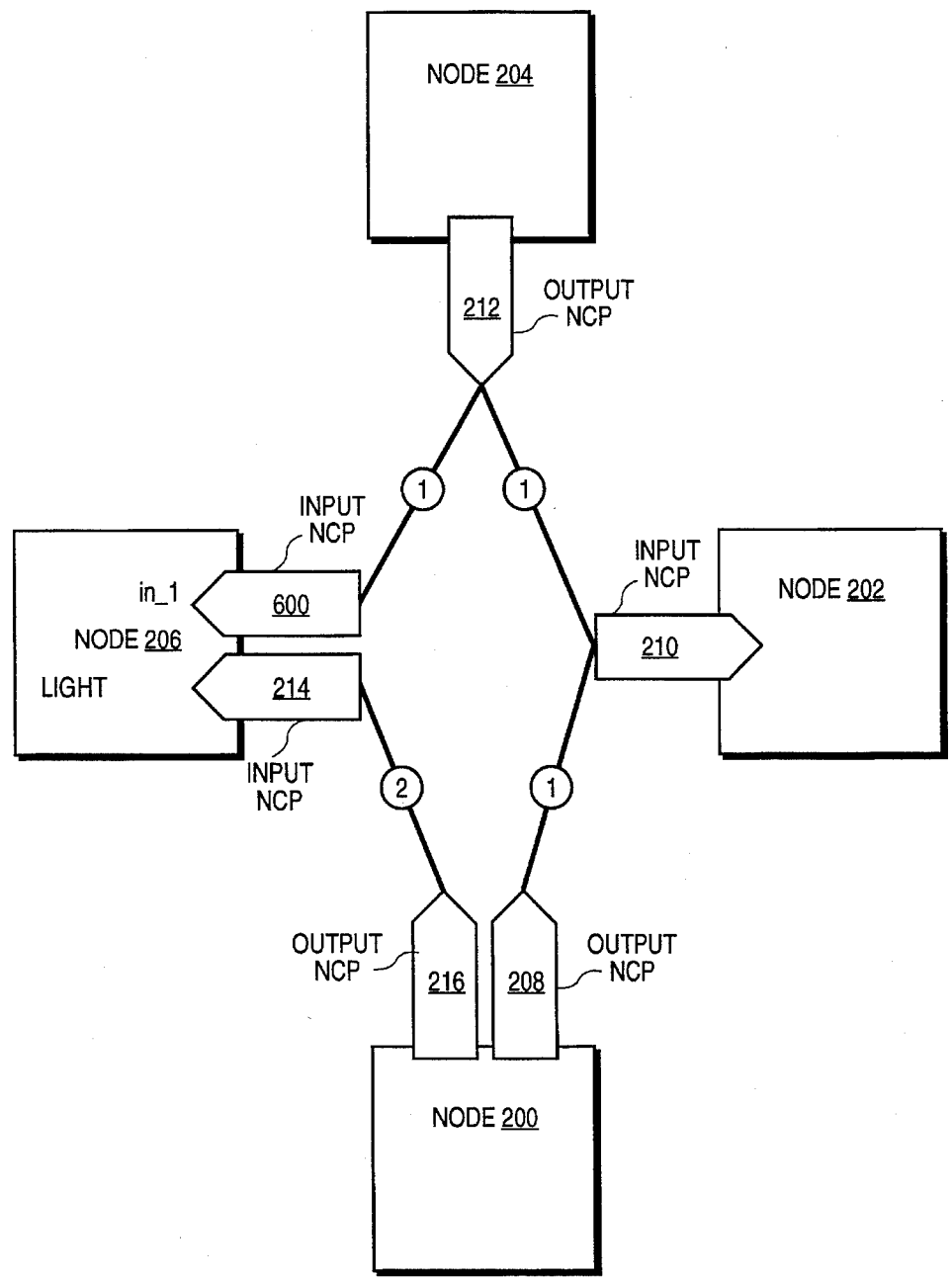
FIG. 6 illustrates a node configuration which resolves the conflict illustrated in FIG. 2 using an alias network variable.

FIG. 6 illustrates a control system network which resolves connection conflicts using an alternative technique than those described above. In FIG. 6, node 206 includes an input network connection point 600 associated with a variable in_1. The variable in_1 is defined in the application program associated with node 206 for the sole purpose of resolving connection conflict problems relating to the variable LIGHT. The variable in_1 must be defined in the application program as the same type of network variable as variable LIGHT.

Rather than couple the input network connection point 214 associated with the variable LIGHT to output network connection point 212, the input network connection point 600 associated with the variable in_1 may be coupled to output network connection point 212 over connection "1". When node 206 receives messages over connection "1", the value of in_1 is updated. When the application program detects that the value of in_1 is updated, the application program copies the value of in_1 into the variable LIGHT. Thus, all changes which occur to the variable in_1 are applied to the variable LIGHT by the application program.

In this example, the application program is using two network variables in the place of one in order to resolve connection conflict. In the present example, the variable LIGHT is a "primary network variable" and the variable in_1 is an "alias network variable" of the variable LIGHT. As with the techniques mentioned above, this technique has the disadvantage that it requires the application program to resolve the connection conflict. This technique also has the disadvantage that it requires application programmers to anticipate what exact connection conflict problems will occur. That is, the application programmer would have to anticipate that the network variable LIGHT would be involved in a network conflict.

Figure 7:
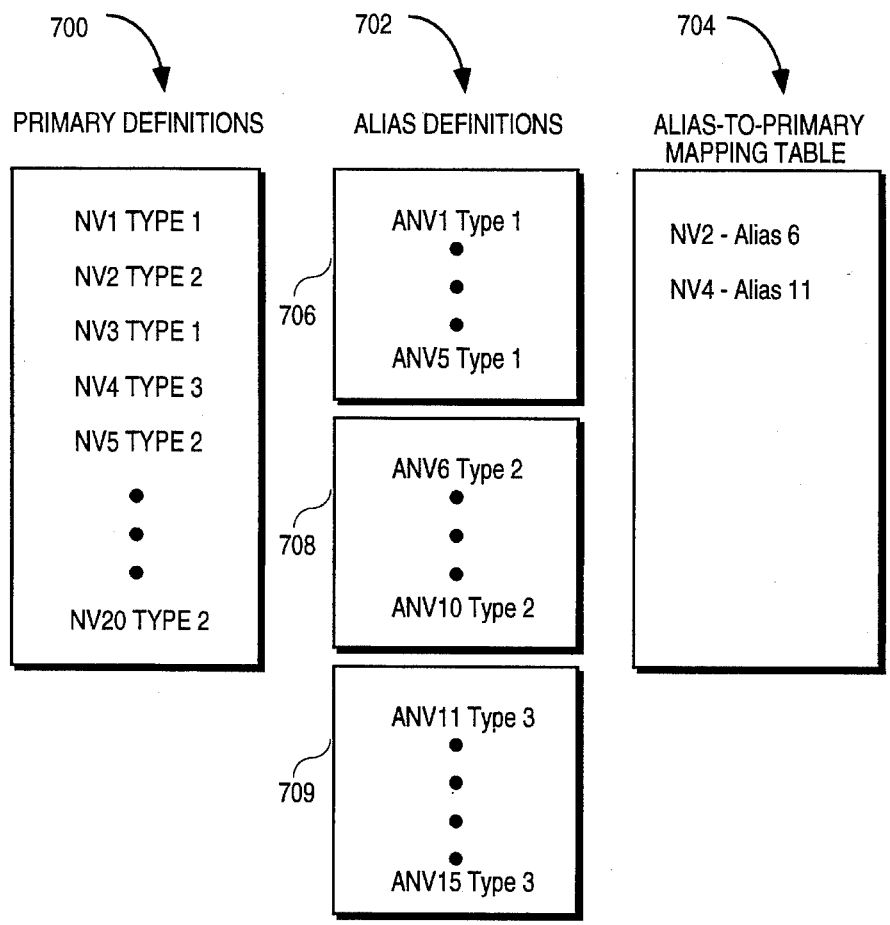
FIG. 7 illustrates primary and alias variable definitions and an alias-to-primary mapping table.

To eliminate the need for application programmers to anticipate exact configuration problems, application programmers may define a set of alias network variables, but defer associating the alias network variables with specific primary network variables until the actual connection conflicts are known. Referring to FIG. 7, an application may use multiple network variables. At 700, twenty primary network variables (NV1 to NV20) are defined within an application program. The definition of each network variable specifies the type of the network variable. For the purposes of explanation, it shall be assumed primary network variables NV1 to NV20 correspond to one of three types, Type 1, Type 2, and Type 3.

When the application is created, the application programmer may not know the specific primary network variables which may be involved in connection conflicts. Therefore, at 702, the application defines some alias network variables of each type. The specific number and types of alias network variables defined in an application will vary from application to application. At 706, ANV1 to ANV5 are defined as Type 1 network variables. At 708, ANV6 to ANV 10 are defined as Type 2 network variables. At 709, ANV11 to ANV15 are defined as Type 3 network variables. Initially, the defined alias network variables do not correspond to any particular primary network variables.

Once the application is installed in a control system network with a particular configuration, actual connection conflicts may be detected. In the present example, it will be assumed that primary network variables NV2 and NV4 are each involved in a connection conflict. To resolve the conflict, the application establishes an alias network variable for each of NV2 and NV4. The alias network variable established for each primary variable must have the same type as the primary variable. Thus, ANV6, which is of Type 2, may be established as the alias for NV2, which is of Type 2. ANV11, which is of Type 3, may be established as the alias of NV4, which is of Type 3.

The application may keep track of the alias mappings in an alias-to-primary mapping table 704, in which each entry specifies an alias network variable and one or more primary network variables which correspond to the alias network variable.

Alternative mapping structures may be used. For example, each entry of mapping table 704 may alternatively correspond to an alias network variable and contain an index to one primary network variable. With this mapping structure, an alias network variable that corresponds to more than one primary network variable would require one table entry for each primary network variable to which it corresponds.

Figure 8:
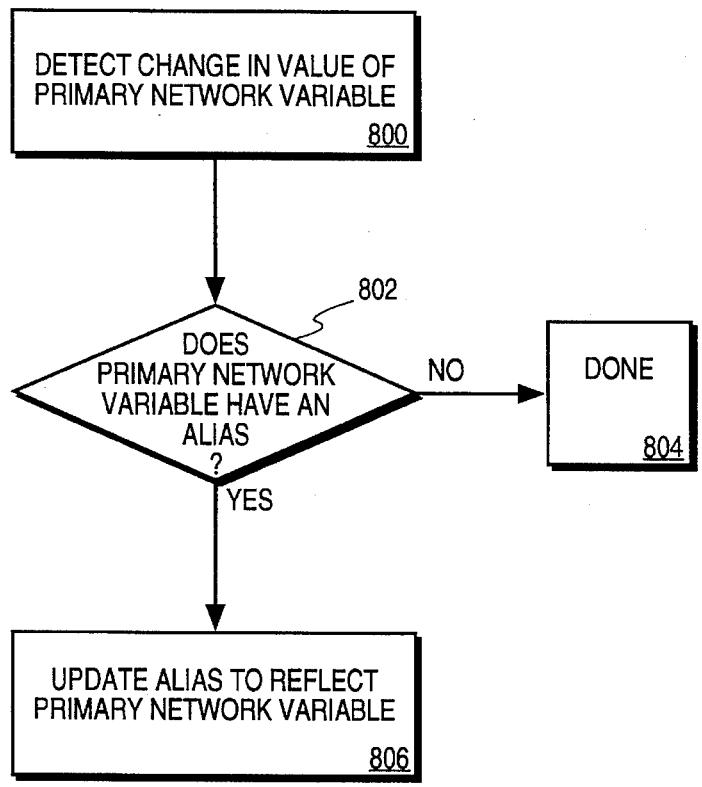
FIG. 8 illustrates a flow chart of steps for updating an alias variable when a primary variable is modified.

Once alias-to-primary variable relationships have been established, the application must perform the necessary overhead to ensure that when the value of an alias network variable changes, the value of its associated primary variable is updated, and visa versa. Referring to FIG. 8, it illustrates the overhead that must be performed by the application when the value of a primary network variable is changed. At step 800, the application detects a change in the value of a primary network variable. At step 802, the application determines whether the network variable has an alias network variable. This step may be performed by inspecting alias-to-primary mapping table 704 to determine if an entry corresponds to the primary network variable. If the primary network variable does not have an alias network variable, no further action is required, as shown at step 804. If the primary network variable has an alias network variable, then at step 806 the alias network variable is updated to reflect the new value of the primary network variable.

Figure 9:
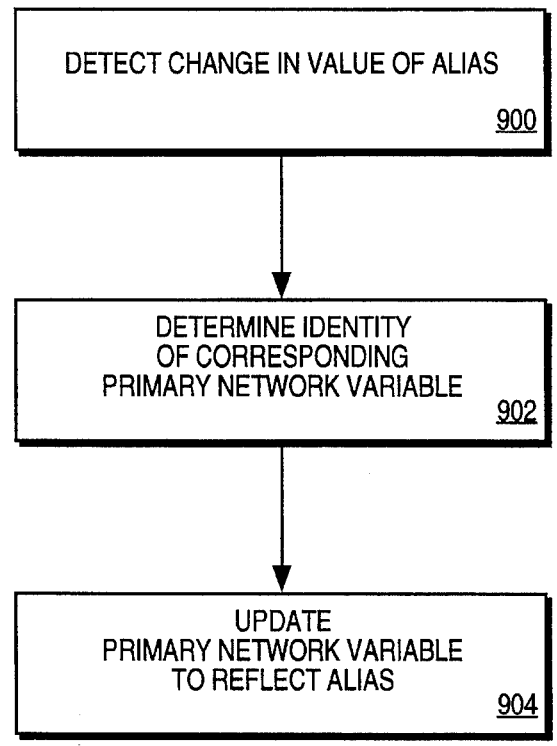
FIG. 9 illustrates a flow chart of steps for updating a primary variable when an alias variable is modified.

Referring to FIG. 9, the application detects a change in the value of an alias network variable at step 900. At step 902, the application determines the identity of the primary network variable which corresponds to the alias network variable. This may be performed by inspecting the entry corresponding to the alias network variable in alias-to-primary mapping table 704. When the primary network variable corresponding to the alias network variable is determined, the value of the primary network variable is updated to reflect the new value of the alias network variable, at step 904.

The use of initially unassigned alias network variables in an application program, as described above, has the advantage that it eliminates the need for the application programmer to know exact configuration problems beforehand. However, it has the disadvantage that many alias network variables that are declared may never be needed, thus resulting in a waste of resources. Further, this technique has the disadvantage that it still involves the application in network-related problems. Preferably, the specifics of network operation should be transparent to applications.

Finally, this technique requires a mechanism for making applications aware of configuration problems. For example, the program which establishes connections to bind network variables (the "binder") may send messages to an application to inform the application of a conflict. The application may then send the binder a message identifying the alias network variable which is to be used to resolve the conflict.

Alternatively, the alias network variable map may itself be defined as a network variable so that the binder can access the map to establish alias network variables and perform the required overhead. However, if the alias map is a network variable, it is subject to certain constraints that apply to network variables, such as rules relating to the number of elements allowed in an array network variable. These constraints may significantly limit the flexibility of this solution.

NETWORK CONNECTION POINT ALIASING

Figure 10:
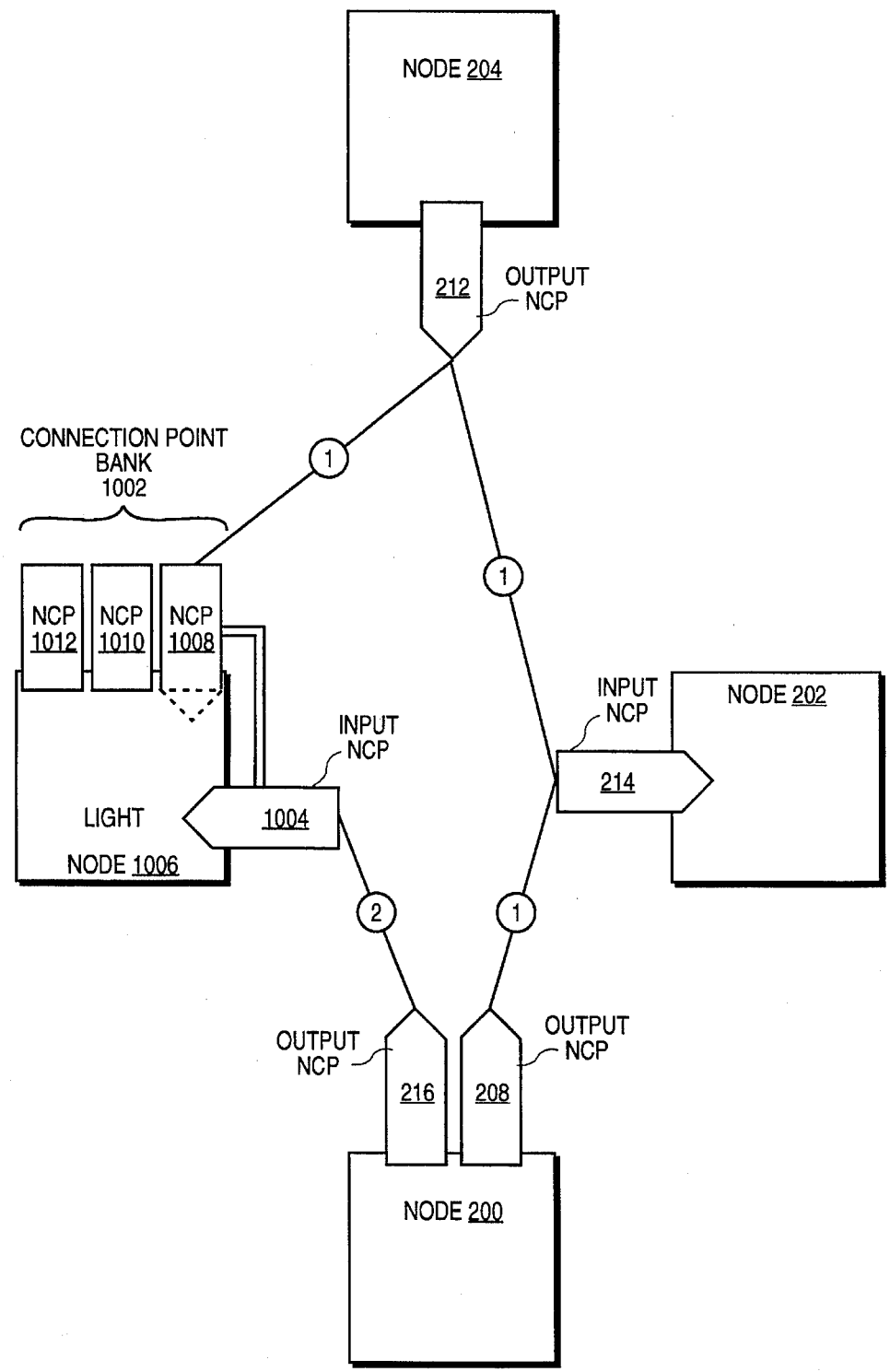
FIG. 10 illustrates a node configuration which resolves the conflict illustrated in FIG. 2 using an alias network connection point.

Referring to FIG. 10, it illustrates a control system network which implements an alternative aliasing technique. According to this technique, node 206 is replaced with a node 1006 which includes an input network connection point 1004 associated with the input network variable LIGHT. In addition, node 1006 includes a network connection point bank 1002 of non-directional network connection points 1008, 1010 and 1012. Each network connection point in network connection point bank 1002 may be used either as an input network connection point or an output network connection point. When the binder determines that output network connection point 212 cannot be directly connected to the input network connection point 1004 associated with the variable LIGHT, the binder connects output network connection point 212 with network connection point 1008 in the network connection point bank 1002. Network connection point 1008 is then be associated with connection "1".

Because network connection point 1008 was connected to output network connection point 212 in place of input network connection point 1004, node 1006 treats all messages received on network connection point 1008 as If they had been received on input network connection point 1004. For example, node 1006 updates the value of the variable LIGHT responsive to messages received at network connection point 1008 as well as messages received at input network connection point 1004. Thus, network connection point 1008 acts as an alias of input network connection point 1004.

Figure 11:
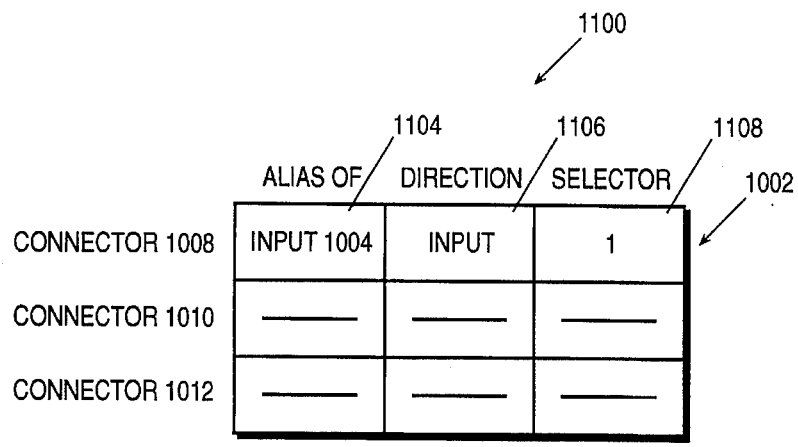
FIG. 11 illustrates a table for storing indications of the correlation between network connection points and network connection points.

Node 1006 stores an indication of the relationship between network connection point 1008 and input network connection point 1004. Such an indication may be stored, for example, in Table 1100 shown in FIG. 11. Each entry of Table 1100 corresponds to a network connection point in network connection point bank 1002. The entry for each network connection point indicates the network connection point for which the network connection point is acting as an alias, the direction of the communication on the network connection point, and a selector. For example, entry 1102 corresponds to network connection point 1008. The first element 1104 in entry 1102 is an index indicating that network connection point 1008 has been established as an alias for input network connection point 1004. The second element 1106 indicates that network connection point 1008 will be acting as a network connection point. This entry may consist of a single bit. The third element 1108 in the entry 1102 is the selector for network connection point 1008, which indicates that network connection point 1008 is associated with connection "1".

When node 1006 receives a message on any network connection point in network connection point bank 1002, node 1006 accesses table 1100 to determine the network connection point associated with the network connection point which received the message. Node 1006 then processes the message as if the message had been received on the associated network connection point.

While the above example illustrates an alias of an input network connection point, a network connection point in network connection point bank 1002 may also be used as an alias to an output network connection point. Therefore, each time node 1006 sends a message via an output network connection point, node 1006 inspects Table 1100 to determine if any network connection point has been established as an alias to the output network connection point. If a network connection point has been established as an alias to the output network connection point, then a duplicate of the message is sent via the network connection point which is serving as the alias. The information contained within the duplicate message will be the same as the original message, but the header information will reflect attributes associated with the alias network connection point. For example, the message will be identified by the selector established for the alias network connection point.

Typically, a node will inform its associated application about whether a message was successfully communicated. The node may determine that a message was successfully communicated, for example, be receiving an acknowledgment to the message. Using the alias technique described herein, the update of one variable may result in the transmission of more than one message. Under these circumstances, it is preferred that the node indicate a successful communication when all relevant messages are successfully communicated, and indicate an unsuccessful communication if any one of the relevant messages is not successfully communicated.

In some circumstances, in may be desirable for the alias network connection point to automatically inherit all of the properties of the network connection point with which it is associated. For example, the messages sent via an alias network connection point will have the same priority level as the messages sent via the associated network connection point. However, by expanding Table 1100, additional functionality may be gained.

Figure 12:
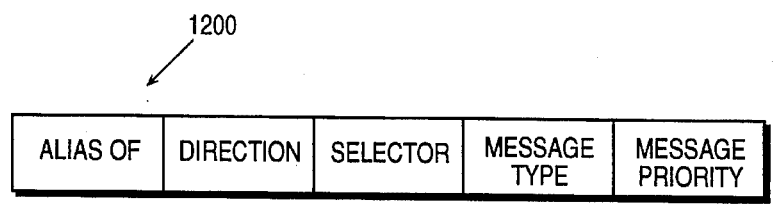
FIG. 12 illustrates an expanded table entry for a table that stores indications of the correlation between network connection points and network connection points.

Referring to FIG. 12, an entry 1200 may include, in addition to the information shown in entry 1102, message type and message priority information. The message type information may indicate whether messages sent from the associated network connection point will be sent to individual nodes or broadcast to multiple nodes. The message priority information may indicate a priority level which determines how messages sent through the network connection point are handled. For example, the message priority information may indicate messages are to have expedited muting or normal routing.

Significantly, this information for an alias network connection point may differ from the same information for a corresponding network connection point. For example, a network connection point Y may be configured to send high priority messages to a device Z. It may also be desirable for the messages to be sent to devices A, B and C. However, it may not be necessary to expedite the delivery of the messages to devices A, B and C. Therefore, a network connection point X may be established as an alias of network connection point Y. A connection separate from the connection between network connection point Y and device Z may be established to connect network connection point X with input on devices A, B and C. The table entry associated with network connection point X may be set to indicate normal priority. As a result, when a high priority message is sent to device Z though network connection point Y, normal priority messages containing the same information will be sent to devices A, B and C.

As mentioned above, a node treats messages received on an alias network connection point as if the message arrived on the network connection point to which the network connection point is an alias. However, when an output network connection point is polled, only that output generates a message in response to the poll. For example, assume that an alias network connection point X is an alias to a network connection point Y, and that network connection point Y is associated with output network variable out_1. If alias network connection point X is polled, a message containing the value of out_1 is sent via alias network connection point X, but no message is sent via network connection point Y. Similarly, if network connection point Y is polled, a message containing the value of out_1 is sent via network connection point Y, but no message is sent via alias network connection point X. This is because only those devices which belong to the connection in which the polling occurred will be expecting a response message.

On the other hand, if an application requests that the network be polled to update the value of an input network variable, a polling message is sent via the network connection point associated with the input network variable and via all alias network connection points associated with the network connection point. For example, assume that an alias network connection point X is an alias network connection point to a network connection point Y, and that network connection point Y is associated with input network variable in_1. If an application requests that the network be polled to update the value of in_1, then a polling message is sent via network connection point Y and a second polling message is sent via network connection point X.

Figure 1:
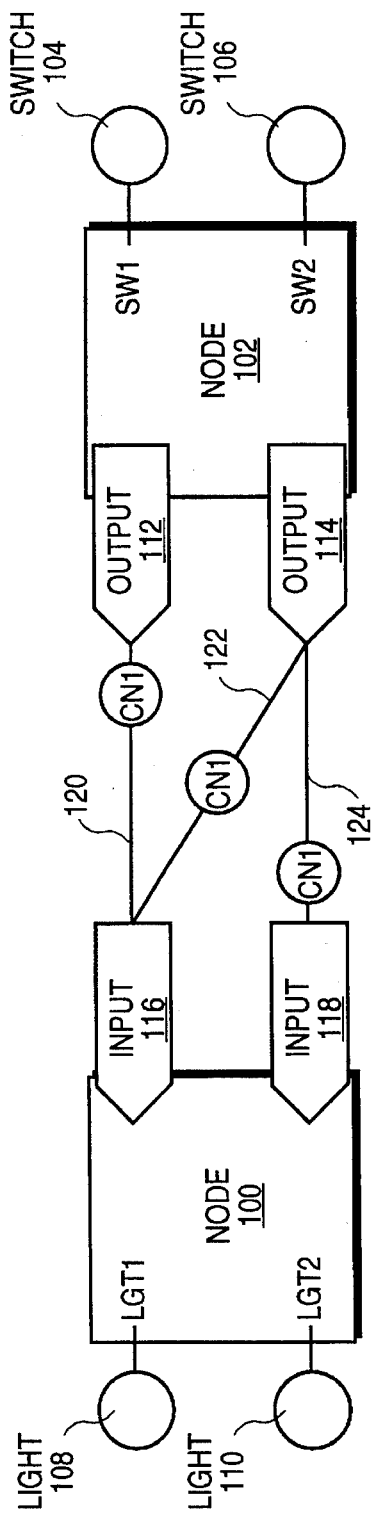
FIG. 1 illustrates a node configuration which results in a connection conflict.
Figure 13:
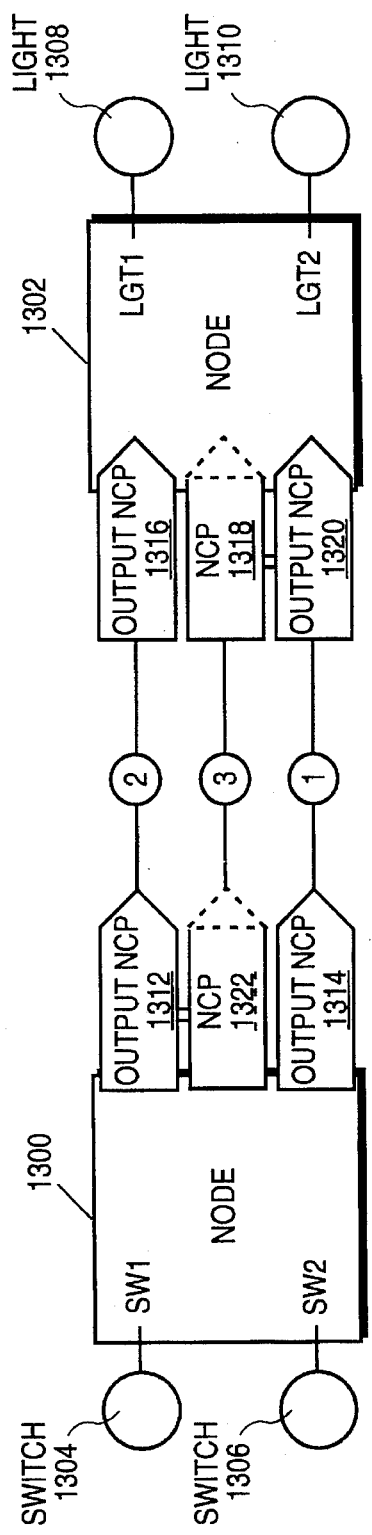
FIG. 13 illustrates a node configuration which resolves the conflict illustrated in FIG. 1 using alias network connection points.

Referring to FIG. 13, it illustrates how network connection point aliasing may be employed to resolve the connection conflict explained above with reference to FIG. 1. A node 1300 is associated with an application which monitors two switches 1304 and 1306. The setting of switch 1304 is stored in a network variable SW1, and the setting of switch 1306 is stored in a network variable SW2. Node 1300 has a network connection point 1312 associated with SW1 and a network connection point 1314 associated with SW2.

A node 1302 is associated with an application which controls power to two lights 1308 and 1310. Light 1308 is activated and deactivated responsive to the value of input network variable LGT1. Light 1310 is activated and deactivated responsive to the value of input network variable LGT2. A user desires to control light 1310 with switch 1306, and to control both lights 1308 and 1310 with switch 1304.

The binder establishes a connection "1" between output network connection point 1314 and input network connection point 1320. Thus, when switch 1306 is activated and the value of SW2 is updated, the value of SW2 will be sent from output network connection point 1314 to input network connection point 1320 to update the variable LGT2. The binder then establishes a connection "2" between output network connection point 1312 and input network connection point 1316. Thus, when switch 1304 is activated and the value of SW1 is updated, the value of SW1 will be sent from output network connection point 1312 to input network connection point 1316 to update the variable LGT2. Note that the connection between output network connection point 1312 and input network connection point 1316 must have a different name than the connection between output network connection point 1314 and input network connection point 1320.

As explained above, output network connection point 1312 cannot simply be connected to input network connection point 1320, since output network connection point 1312 already belongs to connection "2" and input network connection point 1320 already belongs to connection "1". However, a network connection point 1318 on node 1302 may be established as an alias to input network connection point 1320, and a network connection point 1322 may be established as an alias to output network connection point 1312.

Network connection point 1322 may then be connected to output network connection point 1312. The binder may then bind network connection point 1318 to network connection point 1322 over a connection "3". When a message is sent via output network connection point 1312 to control light 1308, a similar message will be sent to network connection point 1318 via network connection point 1322. When network connection point 1318 receives the update message, the value of LGT2 will be updated as if the message had arrived through input network connection point 1320. Thus, operation of switch 1304 will update both LGT1 and LGT2. Consequently, the control system will function as desired.

Figure 14:
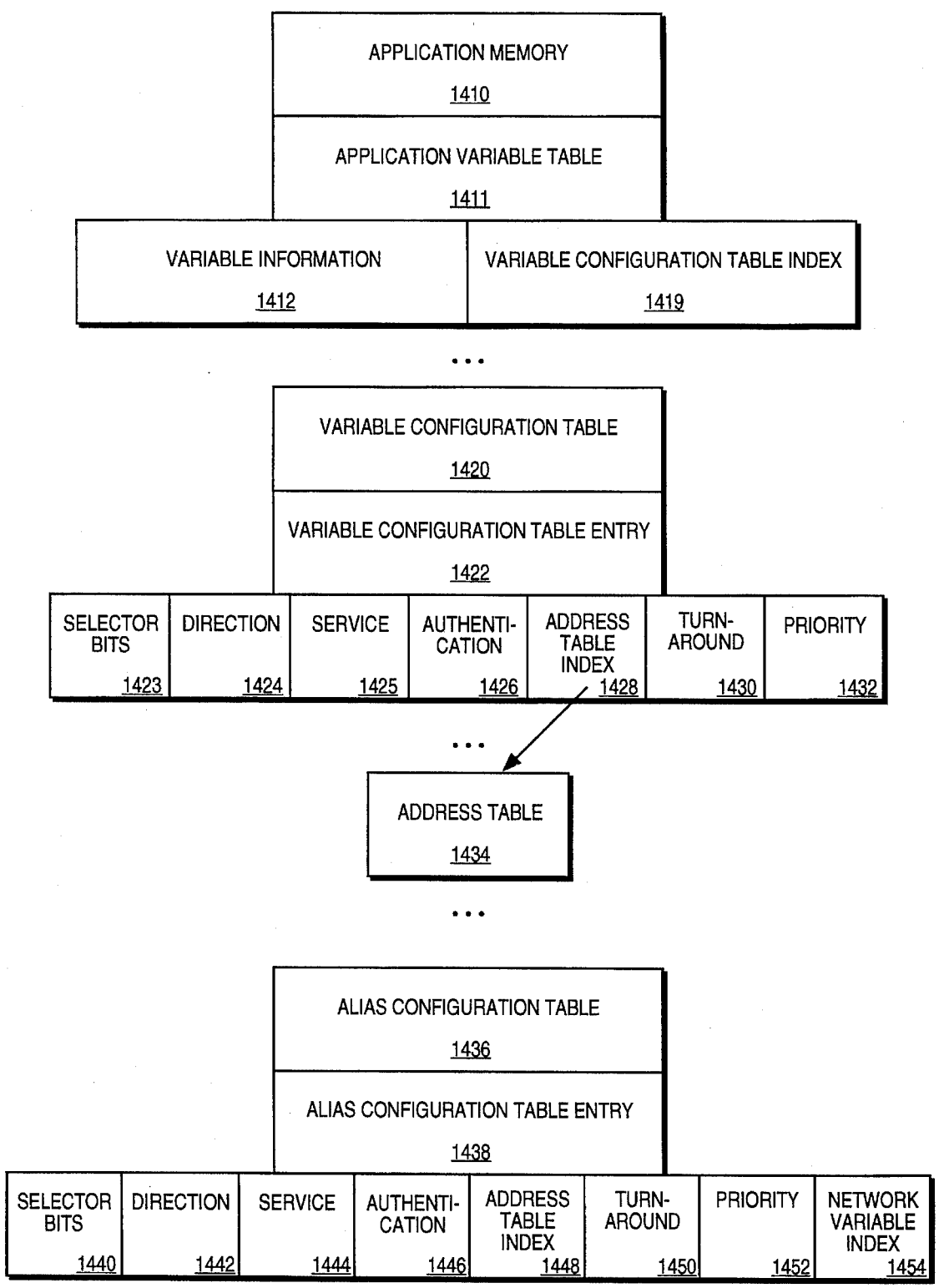
FIG. 14 illustrates a portion of the memory configuration of a node according to an embodiment of the invention.

FIG. 14 illustrates a portion of node memory. This memory organization can be implemented on, for example, node 401.

The application memory 1410 represents the block of memory used to store the program, or application, that a node executes. Application memory 14 10 includes an application variable table 1411. The application variable table 1411 contains references to the variables that can be communicated to nodes in the network. An application initiates a transmission of variable information by changing information pertaining to a variable in the application variable table 1411. Application variable table 1411 includes a number of entries. Each entry corresponds to a variable. Each entry includes variable information 1412, relevant to a particular variable, and a variable configuration table index 1419.

For the purposes of explanation, nodes associated with a single application have been described. However, multiple applications may be associated with a single node. Under these circumstances, application memory 1410 may include multiple programs and multiple application variable tables.

The variable configuration table index 1419 is used to index into the variable configuration table 1420. The variable configuration table is used to hold information about how a variable is to be communicated in the network. The variable configuration table 1420 includes a variable configuration table entry 1422 for each variable in the application variable table 1411.

Each variable configuration table entry 1422 includes: selector bits 1423, and information about direction 1424, service 1425, authentication 1426, turnaround 1430 and priority 1432. Each entry also includes an address table index 1428.

The selector bits 1423 represent a selector to be used with a particular variable. As explained above, a selector indicates the connection with which the variable is associated. The selector bits 1423 are included in the header of a message containing the value of the variable so that nodes which receive the message may determine how to handle the message.

The direction 1424 indicates whether a variable is an input variable or an output variable. The service 1425 indicates the type of service to be used when transmitting a variable. Possible types of service are: unacknowledged, unacknowledged repeated, an acknowledged. Authentication 1426 indicates whether a message must: be authenticated using an authentication process. Turnaround 1430 indicates whether the destination of messages associated with a given variable is the same node that sends the messages. Priority 1432 indicates how messages associated with a variable are to be handled. For example, high priority messages may be handled in a manner to ensure expedited delivery.

The address table index 1428 is an index for an address table 1434. Each address table entry 1433 includes the network address for a node that a sender node can communicate with.

Each entry of variable configuration table 1420 establishes a correspondence between a primary network variable and a network connection point of the node on which application memory 1410 is provided. As mentioned above, within a node, no two network connection points can transmit messages over the same connection. Similarly, no two network connection points receive messages over the same connection. Therefore, no two entries in variable configuration table 1420 have the same direction and selector bits.

Application memory 1410 also includes an alias configuration table 1436. Alias configuration table 1436 is similar to variable configuration table 1420, in that each entry 1438 of alias configuration table includes selector bits 1440, an address table index 1448 and information relating to direction 1442, service 1444, authentication 1446, turnaround 1450, and priority 1452.

Each entry of alias configuration table 1436 establishes a correspondence between a network variable and a network connection point. Entry 1438 includes a network variable index 1454 that indicates the application variable with which entry 1438 corresponds. Typically, an entry in alias configuration table 1436 will correspond to the same variable as an entry in variable configuration table 1420. For example, both entry 1422 and entry 1438 may correspond to a single "Variable X". However, the alias configuration table entry will designate a different selector than the variable configuration table entry.

The entry 1422 in variable configuration table 1420 contains information about how messages relating to Variable X will be sent over a network connection point, while the entry 1438 in alias configuration table 1436 contains information about how messages relating to Variable X will be sent over a network connection point. Since messages about Variable X are sent over both the network connection point and the network connection point, the network connection point acts as an alias of the network connection point.

For example, when the application changes the value of Variable X, the variable configuration entry 1422 corresponding to Variable X is determined by inspecting the variable configuration table index 1419 corresponding to Variable X. A message containing the updated value of Variable X is then transmitted via a network connection point responsive to the values contained in variable configuration entry 1422. Alias configuration table 1436 is then searched to determine if any entries correspond to Variable X. When it is determined that entry 1438 corresponds to Variable X, then a message containing the updated value of Variable X is transmitted via a network connection point responsive to the information contained in alias configuration table entry 1438.

The technique of using alias network connection points to resolve connection conflict overcomes many of the disadvantages associated with other connection conflict resolution techniques. For example, applications programmers do not need to anticipate specific conflicts. The connection conflict resolution is relatively transparent to applications. Further, a network connection point may serve as an alias network connection point for a network variable without regard to the type of the network variable.

The network connection point aliasing technique described herein also provides advantages during node testing. In prior an systems, an input variable could only be updated based on at most one output variable of any given node. Consequently, the number of updates to an input variable in response to a poll operation was restricted to the number of nodes in the connection. This is because the input variable could be associated with only one connection, and no two output variables in a node could be associated with the same connection. Aliasing removes this restriction. For example, a node X may have an output variable out_1 bound to an input network variable over a connection "1", and a second output variable out_2 bound to the same input network variable over a second connection "2". The input variable would be associated with the first connection through a primary network connection point and to the second connection via an alias network connection point. The node associated with the input variable may poll both connections "1" and "2". In response to a poll, the node associated with the input variable would receive two update messages from node X. Thus, the number of update messages is a function of the number of network connection points rather than a function of the number of nodes. This ensures that a node may be tested in the lab without regard to the connection topology in which the node may ultimately be installed.

While specific embodiments of the present invention have been described, various modifications and substitutions will become apparent to one skilled in the art by this disclosure. For example, the information contained in the variable configuration table 1420 and the information contained in the alias configuration table 1436 may be combined in a single table. Such a combined table would specify more than one selector for network variables that are involved in connection conflicts. Consequently, more than one network connection point would be associated with such network variables. Such modifications and substitutions are within the scope of the present invention, and are intended to be covered by the following claims.

What is claimed is:

1. A method for resolving connection conflicts in a network, the method comprising the steps of:
    a) detecting when a first network connection point of a node cannot be associated with a second connection because said first network connection point belongs to a first connection, said first network connection point corresponding to a network variable;
    b) associating a second network connection point of the node to the second connection;
    c) establishing a correspondence between said second network connection point and said network variable;
    d) if said network variable is an input network variable, then
        i) updating said network variable responsive to messages received on said first network connection point, and
        ii) updating said network variable responsive to messages received on said second network connection point; and
    e) if said network variable is an output network variable, then when said network variable is updated with a value,
        i) transmitting the value in a first message identifying said first connection though said first network connection point; and
        ii) transmitting the value in a second message identifying said second connection through said second network connection point.

2. The method of claim 1 wherein the step of establishing a correspondence between said second network connection point and said network variable includes the steps of:
    providing an alias configuration table;
    adding an entry to said alias configuration table, said entry corresponding to said second network connection point and containing a selector identifying said second connection, and a network variable index identifying said network variable.

3. The method of claim 1 wherein said network variable is defined in an application associated with said node, wherein the step of establishing a correspondence between said second network connection point and said network variable includes the steps of:
    defining an alias variable in said application;
    establishing a correspondence between said alias variable and said network variable;
    establishing a correspondence between said alias variable and said second network connection point;
    wherein said step of updating said network variable responsive to messages received on said second network connection point includes
        updating said alias variable responsive to messages received on said second network connection point includes, and
        updating said network variable responsive to updating said alias variable; and
    wherein said step of transmitting the value in a second message identifying said second connection through said second network connection point includes
    updating the alias variable with the value; and
    transmitting the value in the second message responsive to updating the alias variable.

4. The method of claim 3 wherein the step of establishing a correspondence between said alias variable and said network variable includes:

defining a network-variable-to-alias map in said application; and processing said network-variable-to-alias map to cause said network-variable-to-alias map to indicate a correspondence between said network variable and said alias variable.

5. The method of claim 1 wherein said network variable is an input network variable, the method further including the steps of:

when said second network connection point is polled by another network connection, transmitting a response message through said second network connection point but not through said first network connection point; and when said first network connection point is polled by another network connection, transmitting said response message through said first network connection point but not through said second network connection point.

6. Anode for communicating information between applications in a network, the node comprising:

an input/output coupled to at least one node on the network by a first connection;

a network connection point coupled to at least one node on the network by a second connection, wherein the second connection is different from said first connection;

memory containing an application which defines a network variable;

a first indicator indicating that the network variable corresponds to the input/output;

a second indicator indicating that the input/output corresponds to the first connection;

a third indicator indicating that the network variable corresponds to the network connection point; and a fourth indicator indicating that the network connection point corresponds to the second connection;

a transmit mechanism for transmitting a first message over said first connection and a second message over said second connection when said network variable is updated if said network variable is an output network variable; and an update mechanism for updating said network variable responsive to messages over said first connection and responsive to messages over said second connection if said network variable is an input network variable.

7. The node of claim 6 wherein said memory stores a network variable configuration table and an alias configuration table, wherein said second indicator is stored in an entry in the network variable configuration table, wherein said third indicator and said fourth indicator are stored in an entry in said alias configuration table.

8. The node of claim 7 wherein the transmit mechanism transmits the first message responsive to information contained in the entry in the network variable configuration table and transmits the second message responsive to information contained in the entry in the alias configuration table.

9. The node of claim 7 wherein the entry in the network variable configuration table specifies a different message priority level than the entry in the alias configuration table.

10. A method for updating an input network variable associated with a node based on a first output network variable and a second output network variable, wherein the first output network variable and the second output network variable are both associated with a second node, comprising the steps of:

binding the input network variable to the first output network variable over a first connection through a primary network connection point;

binding the input network variable to the second output network variable over a second connection through an alias network connection point;

causing the first node to transmit a polling message over the first connection through the primary network connection point and over the second connection through the alias network connection point;

causing the second node to generate a first update message containing the value of the first output network variable over the first connection responsive to the polling message on the first connection; and causing the second node to generate a second update message containing the value of the second output network variable over the second connection responsive to the polling message on the second connection; and updating the input network variable responsive to the first update message and the second update message.

11. The method of claim 1 wherein a plurality of nodes in addition to said node have network connection points associated with said first connection.

12. The method of claim 11 wherein a second plurality of nodes in addition to said node have network connection points associated with said second connection.

13. The method of claim 1 wherein said network variable is an input network variable, the method further comprising the step of performing a polling operation for said input network variable by sending a first polling message over said first connection through the first network connection point and sending a second polling message over said second connection through the second connection point.

14. The node of claim 6 wherein said network variable is an input network variable and said transmit mechanism is configured to perform a polling operation for said input network variable by transmitting a first polling message over said first connection and a second polling message over said second connection.

* * * * *

UNITED STATES PATENT AND TRADEMARK OFFICE
CERTIFICATE OF CORRECTION

PATENT NO. : 5,500,852
DATED : March 19, 1996
INVENTOR(S) : Glen M. Riley

It is certified that error appears in the above-indentified patent and that said Letters Patent is hereby corrected as shown below:

In the Abstract at [57] in line 2 delete "provide" and insert --provided--

In column 3 at line 51 delete "point 21.4" and insert --point 214--

In column 4 at line 53 insert --is-- following "variable" and prior to "updated"

In column 4 at line 60 delete "though" and insert --through--

In column 7 at line 3 delete "! /0" and insert --I/O--

In column 8 at line 2 delete "convening" and insert --converting--

In column 8 at line 3 delete "message:," and insert --message,--

In column 9 at line 54 delete "visa versa" and insert --vice versa--

In column 10 at line 60 delete "If" and insert --if--

In column 11 at line 49 delete "be" and insert --by--

In column 12 at line 9 delete "muting" and insert --routing--

In column 12 at line 25 delete "though" and insert --through--

UNITED STATES PATENT AND TRADEMARK OFFICE
CERTIFICATE OF CORRECTION

PATENT NO. : 5,500,852
DATED : March 19, 1996
INVENTOR(S) : Glen M. Riley

It is certified that error appears in the above-indentified patent and that said Letters Patent is hereby corrected as shown below:

In column 13 at line 52 delete "14 10" and insert --1410--

In column 14 at line 24 delete "an" and insert --and--

In column 14 at line 25 delete "must:" and insert --must--

In column 15 at line 33 delete "an" and insert --art--

In column 16 at line 27 delete "though" and insert --through--

In column 17 at line 11 insert --point associated with said second connection-- following "connection" and prior to ","

In column 17 at line 15 insert --point associated with said first connection-- following "connection" and prior to ","

In column 17 at line 19 delete "Anode" and insert --A node--

Signed and Sealed this

Twenty-second Day of April, 1997

Attest:

BRUCE LEHMAN

*Commissioner of Patents and Trademarks*

*Attesting Officer*